T. PRICE.
MINE CAGE HOIST.
APPLICATION FILED JAN. 15, 1919.

1,300,647.

Patented Apr. 15, 1919.

INVENTOR
Thomas Price.
BY
Fred G. Dieterich
ATTORNEYS

UNITED STATES PATENT OFFICE.

THOMAS PRICE, OF NANAIMO, BRITISH COLUMBIA, CANADA.

MINE-CAGE HOIST.

1,300,647.

Specification of Letters Patent.   Patented Apr. 15, 1919.

Application filed January 15, 1919.   Serial No. 271,266.

*To all whom it may concern:*

Be it known that I, THOMAS PRICE, a citizen of the Dominion of Canada, residing at Nanaimo, in the Province of British Columbia, Canada, have invented certain new and useful Improvements in Mine-Cage Hoists, of which the following is a specification.

This invention relates to a means preventing accidents to mine shaft cages through the breaking of one of the wire ropes by which the cages are raised and lowered. It is applied to that class where the weight of one cage is countered against that of the other.

Although there are many devices for clutching or sustaining a mine cage within the framing of the shaft, in the event of a winding rope breaking, and such may serve the desired purpose with an ascending cage, which is the usual one to break, they are not dependable to check a descending cage at the high speeds at which they are usually run, as the momentum of a descending cage at a high velocity is too considerable to be safely checked by mechanical means.

The obvious resort is to increase the factor of safety by providing two ropes for each cage, each of which ropes has a sufficient factor of safety to sustain its load under ordinary circumstances.

To apply two ropes in the ordinary manner to each winding drum necessitates doubling the length or the capacity of the winding drums, but in the device, which is the subject of this application, the capacity of the winding drums does not require to be enlarged as the supplementary rope for one cage is applied to the winding drum of the other cage.

Figure 1:
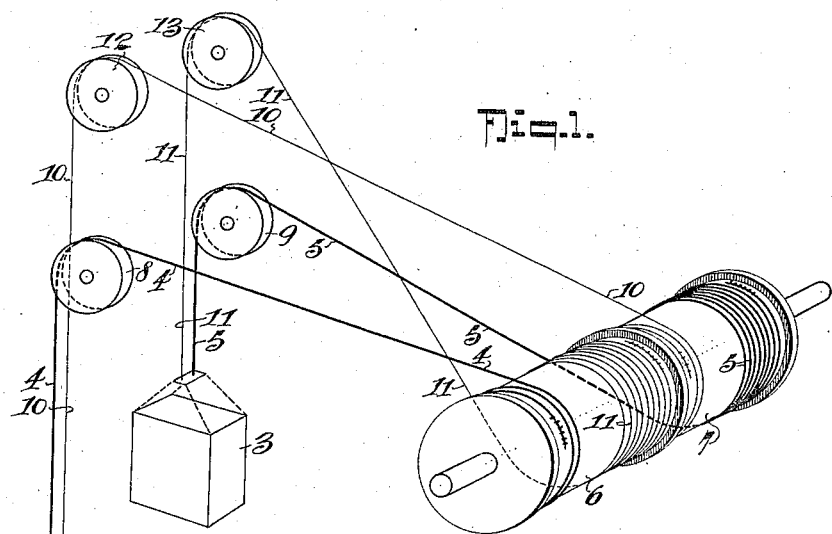

The particular means by which this device is carried out is fully set forth in the following specification, reference being made to the drawings by which it is accompanied, in which:

Figure 1 is a perspective view in elevation, and

Figure 2:
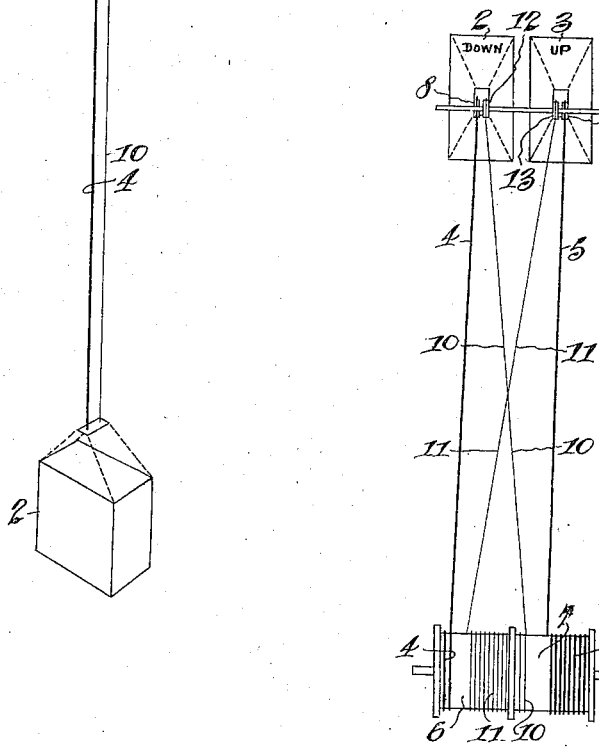

Fig. 2, a plan of the same.

These drawings are more or less diagrammatic in that the pit head framing and the winding drum mechanism are not illustrated. These details of head frame, etc., are not material to the invention and would interfere with the illustration of the connection of the wire ropes between the cages and the drums.

In these drawings 2 and 3 represent the mine shaft cages vertically movable in the parallel shafts of the mine, the same being connected by wire ropes 4 and 5 over sheaves 8 and 9 mounted in the pit head frame, to the drums 6 and 7 of the winding engine. These winding drums are in practice secured to rotate together on the shaft by which they are carried, so that they are practically two halves of the same drum separated from one another by a medial flange, as shown in Fig. 2.

The rope 4 of the cage 2 passes around the upper side of its drum 6, and the rope 5 of the other cage 3 passes around the underside of its drum 7, so that the weight of one cage counters that of the other on the drum and if the cage 2 is toward the bottom of the shaft its rope is unwound from the drum 6 while the rope 5 of the other cage, being at the upper limit, is coiled on its drum 7.

The description thus far covers the existing practice for raising and lowering the cages of a mine shaft.

To attain the safety of a double rope to each cage and at the same time avoid the expense of drum enlargement, I provide supplementary ropes 10 and 11 connected respectively to each of the cages 2 and 3, which supplementary ropes pass over supplementary sheaves 12 and 13 in the pit head frame and each is connected respectively to the drum 7 or 6 of the other cage: That is, the supplementary rope 10 from the cage 2 passes over the supplementary sheave 12 and is connected over the upper side of the drum 7 of the cage 3, and the supplementary rope 11 of the cage 3 passes over the supplementary sheave 13 and is connected to the drum 6 around its underside.

The connection of each of these supplementary ropes to the drums is thus diametrically opposite the connection of the primary rope to which the drum belongs. The supplementary ropes are diametrically opposite one another, but the primary and supplementary rope of one cage are connected to diametrically the same side, but diametrically opposite those of the other cage, so that as the ropes of one cage are coiled on the drums those of the other are uncoiled from them.

The sheaves 12 and 13 will, if necessary, be angled in plan to the lead of the ropes 10 and 11 to the drums.

These sheaves 12 and 13 are shown as mounted in an upward extension of the pit head frame, but this is only done to enable the connection of the respective ropes to be better illustrated. It may, however, be necessary to do so where this safety provision is applied to an existing cage hoisting gear, but where the device is applied to a new plant, the sheaves 8 and 9 and 12 and 13 may be mounted as close as practicable together.

Prior to my invention mine cages may have been suspended by multiple ropes which have been wound together on their respective parts of the winding drum, but this arrangement, as previously stated, would require enlargement of the winding drum capacity.

It has also previously been proposed to connect oppositely movable mine cages directly together by a supplementary wire rope passing around an arrangement of sheaves mounted in the pit head frame but without direct connection to the winding drum.

In such case, if the winding rope breaks, the supplementary rope not being connected to the winding drum cannot check the momentum of the descending cage.

Neither of these cases anticipate the construction as set forth in the foregoing specification where the supplementary rope of each cage is directly connected to the winding drum.

To distinguish the two sets of lift cables, I have shown the supplementary cables as of light lines in contradistinction to the main cables 4 and 5 which are shown in heavy lines, it being understood, however, that in practice the cables are preferably of the same diameter.

Having now particularly described my invention, I hereby declare that what I claim as new and desire to be protected in by Letters Patent, is:

1. The combination with two cages operable in separate compartments of a mine shaft, a winding drum, a rope separately connecting each cage to diametrically opposite sides of said winding drum so that one cage may ascend as the other descends, and a supplemental rope from each cage to that half of the winding drum to which the other cage is connected.

2. The combination with two cages movable in separate compartments of a mine shaft, two winding drums secured to rotate together, a flexible suspending connection between each cage and diametrically opposite sides of the said winding drums so that as one cage ascends the other descends, a separate supplementary flexible suspending connection from each cage to the winding drum of the other cage, said connection being taken around the diametrically opposite side of the drum to the other connection thereto, the two connections from each cage being therefore taken around the same side of each drum.

3. The combination with two cages operable in separate compartments of a mine shaft, two winding drums secured to rotate together, a separate cable connection from each of said cages to diametrically opposite sides of said winding drums whereby one cage may ascend as the other descends, a supplementary cable from each cage to the winding drum of the other cage, the connection of said supplementary cable with respect to the winding drum being taken around the same side of the drum as the connection from the same cage on the other drum.

4. The combination with two cages movable in opposite directions, a winding drum, a flexible line suspending each cage, said lines being connected to diametrically opposite sides of said winding drum so that as the line of one cage is wound on the drum to lift its cage, the line of the other cage is unwound from the drum to lower the other cage, a supplementary line connected to each cage and to the winding drum adjacent to the line of the other cage so that the two lines of one cage may occupy the space on the winding drum as the lines of the other cage are unwound from it.

5. The combination with two cages movable in opposite directions, a winding drum, a flexible line suspending each cage, said lines being connected to diametrically opposite sides of said winding drum so that as the line of one cage is wound on the drum to lift its cage, the line of the other cage is unwound from the drum to lower the other cage, a supplementary line connected to each cage and to the winding drum adjacent to the line of the other cage so that the two lines of one cage may occupy the space on the winding drum as the lines of the other cage are unwound from it, said winding drum being divided by a medial flange into two parts, one of said suspending lines of one cage being connected to the diametrically same side of each part of the drum and the suspending line of the other cage being connected to the same side of each part of the winding drum but diametrically opposite to those of the other cage.

In testimony whereof I affix my signature.

THOMAS PRICE.